United States Patent Office 2,866,718
Patented Dec. 30, 1958

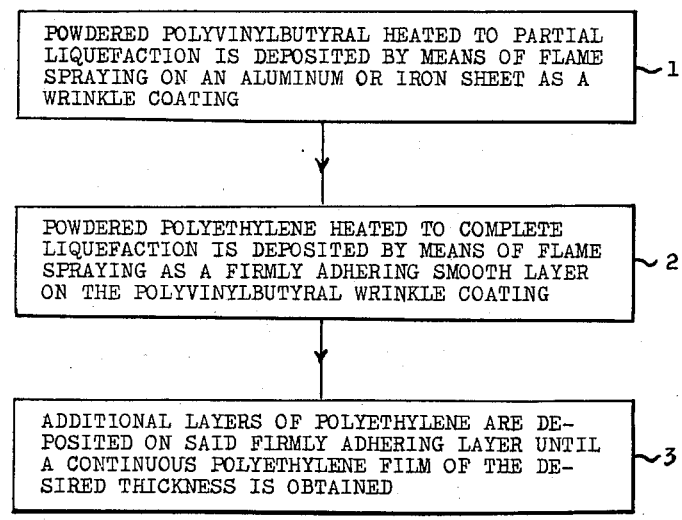

2,866,718

METHOD OF PROVIDING SURFACES WITH A STRONGLY ADHERING POLYETHYLENE FILM

Giuseppe Guzzetta, Milan, Italy, assignor to Montecatini, Societa Generale per l'Industria Mineraria e Chimica, a corporation of Italy Application January 12, 1955, Serial No. 481,473

Claims priority, application Italy January 26, 1954

7 Claims. (Cl. 117—21)

The present invention relates to a method of securely bonding polyethylene coatings to various surfaces, such as surfaces of iron, aluminum, cement and so forth.

Polyethylene is known for its resistance to most chemical compounds, including acids, bases, salts, etc., and the resin has been used to form protective coatings on iron and other surfaces to render them corrosion-proof.

One of the methods for obtaining such coatings consists in flame spraying polyethylene in form of a very fine powder, so as to deposit the liquefied material in form of a continuous and clear protective coating on the surface that is to be covered. In order to obtain the benefits of such a coating, it is important that the coating material does not only possess the necessary protective quality but, at the same time, adheres firmly to the base to which it has been applied. There are two types of adhesion: mechanical adhesion, depending primarily upon irregularities in the surface to be coated, as well as specific adhesion, based on chemical or molecular affinities between the base and the coating.

Polyethylene is a non-polar polymeric compound and, therefore, lacks the ability of specific adhesion to polar materials such as iron, copper, cement, etc.

In order to enhance the adhesion of polyethylene to surfaces of material of the afore-listed type, it has been suggested to roughen such surfaces, for example by means of sand blasting, and in this manner attain a better mechanical adhesion. However, the results have been unsatisfactory and the desired degree of adhesion has not been attained.

Other suggestions comprise the addition of carbon black, graphite, polyisobutylene and polyvinylbutyral to the polyethylene in order to increase the adhesive properties. However, the desired improvements were likewise found to be lacking.

I have now discovered that excellent adhesion between polyethylene coatings and bases of the afore-mentioned type may be attained if an intermediary coating adhering to both the base and the polyethylene film is applied between the two. I found, furthermore, that certain resins, primarily resins of the polyvinyl acetal group, are most suitable for such intermediary coats.

Polyvinyl acetal resins are obtained by condensing polyvinyl alcohol or a partially hydrolyzed polyvinyl alcohol ester with an aldehyde, such as formaldehyde, acetaldehyde, butyraldehyde, benzaldehyde, etc. However, the polyvinyl acetals preferred for this application are those resulting from the condensation of polyvinyl alcohol with formaldehyde or butyraldehyde, i. e. polyvinyl formal and polyvinyl butyral.

These resins can be applied in form of solutions in suitable solvents but, for optimum results, I prefer to apply them in the same manner as the polyethylene, namely by flame spraying.

The principle of the present invention is illustrated in the accompanying flow diagram, depicting the steps comprising the herein-claimed method.

In contrast to polyethylene which has a sharp melting point and, if sprayed at a sufficiently high temperature, melts and forms a smooth, continuous film, polyvinyl formal and polyvinyl butyral have not a sharp melting point and, therefore, may be caused to undergo only a partial softening upon flame spraying. Consequently, upon being applied to a base, although they adhere firmly thereto, they do not form a smooth film but a very irregular coating the surface of which is full of randomly formed depressions and rises.

If, thereupon, a first layer of polyethylene is deposited in liquid form on the polyvinyl formal or polyvinyl butyral coating, the polyethylene enters into these depressions and is firmly united with the polyvinyl compound. Upon application of subsequent layers of polyethylene, the number of which depends upon the desired thickness, a homogeneous and smooth protective coating is obtained.

On the other hand, if the polyvinyl formal or butyral is sprayed at too high a temperature, it will melt and fuse into a smooth surface film to which polyethylene does not as strongly adhere as when the material for the intermediary layer is sprayed at a temperature sufficiently low to produce a highly wrinkled surface.

These facts suggest that the polyvinyl formal and polyvinyl butyral cause adhesion of the polyethylene in two ways: in the first place because a certain specific adhesion manifests itself if polyethylene, particularly liquefied polyethylene, is brought in intimate contact with polyvinyl acetals; secondly, because of irregularities of the previously only partially liquefied intermediary coating, surface irregularities result in which the subsequently applied first layer of polyethylene anchors itself mechanically.

The function of the polyvinyl acetal layer can be compared with that of a sand-blasted surface, with the difference, however, in favor of the resin, that there is also specific adhesion resulting from a nearly homogeneous fusion between polyethylene and polyvinyl formal or butyral.

As may be seen from the foregoing description, the application of a polyvinyl formal or butyral intermediary layer can replace sand-blasting, providing the sand-blasting is done in order to roughen the surface but not if it is applied for, say, cleaning a rusted iron surface.

There is no satisfactory method available as yet for accurately measuring the degree of adhesion of polyethylene coatings and, in lieu thereof, resort has been had to the simple procedure of disengaging with the aid of a knife a section of the coating large enough to be grasped by hand. Adhesion is considered good if, upon lifting by hand, the coating breaks instead of becoming loose.

The following examples are to illustrate, but in no way to restrict, the scope of the present invention.

*Example 1*

A smooth and bright aluminum sheet, cleaned with xylene, is flame sprayed over one half of its surface area with polyvinyl formal powder. The temperature of the flame is thereby regulated in such a manner that the polyvinyl formal powder is not yellowed and is melted only partially. Upon anchoring itself on the aluminum surface, the sprayed material forms a thin, but highly wrinkled coating. About 80 to 100 gr./m.² of the material are sufficient for this purpose.

As the next step, the entire aluminum sheet is flame sprayed with grey polyethylene powder grade 7, which is a resin powder having a molecular weight of 18,000 (Staudinger). Application is continued until a smooth and clear coating of about 1 mm. thickness is obtained. A porosity test with the spark detector shows the absence of pin point formation.

With the aid of a knife it is easy to lift some of the film at that portion of the aluminum sheet which did not receive any polyvinyl coating. If the lifted part is pulled from the base, additional portions of the film part easily from the base until the zone is reached where the wrinkled polyvinyl formal coating had been applied. Here the polyethylene film sticks firmly to the base and cannot be pulled off; instead, if sufficient effort is exerted, the film breaks.

Example 2

The procedure of Example 1 is repeated, with the only difference that an aluminum sheet is used, the surface of which has been roughened by means of emery paper. Adhesion of the polyethylene film within the zone which did not receive a polyvinyl acetal coating is improved but not to the extent that the polyethylene film could not be pulled off.

It is reasonable to presume that adhesion of the polyethylene coating is also better where the roughened aluminum sheet had been first coated with a layer of polyvinyl formal. Unfortunately, the testing method used is not sensitive enough to indicate any such difference.

Example 3

After cleaning a standard iron plate, free from rust, by means of xylene, one half of its surface is flame sprayed with polyvinyl formal powder whereby the flame temperature is regulated in such a manner that the powder does not yellow and liquefies only partially. Upon anchoring itself on the surface of the iron sheet, the polyvinyl acetal resin forms a thin but highly wrinkled coating.

The entire surface of the iron plate is then flame sprayed with the polyethylene powder used in Example 1, to produce a coating 1 mm. in thickness. When tested with the spark detector, no pin point pore formation is found.

At the portion of the iron plate which did not receive a polyvinyl formal primer coat, it is easy to lift the polyethylene film with the aid of a knife. When pulling by hand, additional portions of the polyethylene film can be removed from the base but not as readily as in the case of an aluminum sheet. However, as soon as the region of the polyvinyl formal primer coat is reached, the polyethylene film adheres so firmly that small pieces can be removed only with the aid of a chisel.

The fact that firm adherence of a polyethylene film can be obtained without previous sand-blasting of the plate is of considerable importance, because sand-blasting is a troublesome and expensive procedure and is incapable of attaining the desired purpose unless carried out with very coarse grit. Moreover, sand-blasting requires that the article, subsequently to be covered with polyethylene, must be taken to a workshop especially equipped for this purpose, whereas the flame spray application of a polyvinyl acetal primer and a polyethylene coating has the advantage that the necessary equipment can be easily transported and used everywhere.

Moreover, sand-blasting is not always feasible, for example, where the thickness of the article to be coated is such that it would not bear the impact of coarse grit without considerable losses in its mechanical characteristics or where the object to be covered is located near equipment that could be damaged by dust and grit.

It should be repeated, however, that the possibility of omitting sand-blasting when applying polyethylene coatings refers to sand-blasting for the purpose of roughening the surface, but not to sand-blasting employed for cleaning iron surfaces from loose, easily detachable rust.

Example 4

Half of the surfaces of each, an aluminum sheet and an iron sheet, are flame sprayed with polyvinyl butyral powder without any previous surface treatment except degreasing with xylene. During the spraying of polyvinyl butyral, the flame temperature is kept considerably lower than in the case of polyvinyl formal; at best, sufficiently low to avoid a deep yellow coloration of the resin.

Immediately after application of the polyvinyl butyral coatings, the entire surfaces of both sheets are sprayed with polyethylene in the afore-described manner, resulting in smooth and clear coats, free from pin point formation.

With the aid of a knife, it is easy in either case to lift a short section of the film where there is no polyvinyl butyral primer coating. If, at this point, the film is pulled by hand, it comes off easily from the aluminum and the iron base until the zones are reached which had been sprayed with the primer coating. There, the polyethylene film sticks so firmly that small pieces can be taken off only by means of a chisel.

If the tests of Examples 1 to 4 are repeated on other surfaces, such as brass, copper or cement surfaces, similar results are obtained, that is to say, a polyethylene film sprayed on a surface previously coated in a specific manner with polyvinyl formal or polyvinyl butyral resin tends to attach firmly to the base and will rather break than yield to attempts of separating it from the base, in contrast to polyethylene coatings applied to the same bases without an intermediary polyvinyl formal or butyral layer which can be easily detached.

The advantages of the herein-disclosed invention will be obvious from the foregoing description and the examples set forth. The most important of these advantages are:

(a) The polyethylene coating adheres very strongly to the intermediary layer and, therefore, to the base, (b) No migration of the primer coating into the top portion of the polyethylene layer takes place, and the protective properties of the polyethylene coating remain unimpaired, (c) The creation of surface irregularities at the base material, such as by means of sand-blasting, is superfluous. By means of the intermediary layer of polyvinyl acetal, polyethylene adheres strongly to even smooth surfaces.

(d) In addition, the herein-disclosed method permits the use of flame spraying which does not require any solvents for the resins. Consequently, the method is valuable from the time and cost point of view and, moreover, is capable of producing coatings free from any pin point development, ordinarily occurring upon the evaporation of a solvent.

I claim:

1. The method of providing a smooth iron surface with a strongly adhering, continuous polyethylene film, comprising flame spraying the surface with about 80 to 100 gr./m.$^2$ of powdered polyvinyl formal resin heated to partial liquefaction to deposit said polyvinyl formal resin as a wrinkle coating, and flame spraying said wrinkle coating with powdered polyethylene heated to complete liquefaction to deposit said polyethylene as a smooth, continuous film.

2. The method of providing a roughened aluminum sheet with a strongly adhering, continuous polyethylene film, comprising flame spraying the sheet with powdered polyvinyl butyral resin heated to partial liquefaction to deposit said polyvinyl butyral resin as a wrinkle coating, and flame spraying said wrinkle coating with powdered polyethylene heated to complete liquefaction to deposit said polyethylene as a smooth, continuous film, about 1 mm. in thickness.

3. The method of providing a surface selected from the group consisting of iron, copper, brass, aluminum and cement with a strongly adhering, continuous polyethylene film, comprising flame spraying the surface with a powdered polyvinyl acetal resin heated to partial liquefaction to deposit said polyvinyl acetal resin as a wrinkle coating, and flame spraying said wrinkle coating with powdered polyethylene heated to complete liquefaction to deposit said polyethylene as a smooth, continuous film.

4. The method of claim 3, wherein said powdered polyvinyl acetal resin is polyvinyl formal.

5. The method of claim 3, wherein said powdered polyvinyl acetal resin is polyvinyl butyral.

6. The method of providing a smooth surface selected from the group consisting of iron, copper, brass, aluminum and cement with a strongly adhering, continuous polyethylene film, comprising flame spraying the surface with a powdered polyvinyl acetal resin heated to partial liquefaction to deposit said polyvinyl acetal resin as a wrinkle coating, and flame spraying said wrinkle coating with powdered polyethylene heated to complete liquefaction to deposit said polyethylene as a smooth, continuous film.

7. The method of providing a surface selected from the group consisting of iron, copper, brass, aluminum and cement with a strongly adhering, continuous polyethylene film, comprising wrinkle-coating the surface with a polyvinyl acetal resin by flame spraying to partial liquefaction of the coating, and flame spraying said wrinkle coating with powdered polyethylene heated to complete liquefaction to deposit said polyethylene as a smooth, continuous film.

References Cited in the file of this patent

UNITED STATES PATENTS

| | | |
|---|---|---|
| 1,976,191 | Root | Oct. 9, 1934 |
| 2,158,111 | Dolittle | May 16, 1939 |
| 2,697,058 | Lasak | Dec. 14, 1954 |
| 2,756,167 | Barnett | July 24, 1956 |